United States Patent
Anderson

(10) Patent No.: US 10,757,142 B2
(45) Date of Patent: Aug. 25, 2020

(54) ASSIMILATED ECONOMIC CRIME INTELLIGENCE SYSTEM AND METHOD

(71) Applicant: Financial Crime Intelligence Ltd, Sidcup (GB)

(72) Inventor: Christopher Gerard Anderson, Sidcup (GB)

(73) Assignee: FINANCIAL CRIME INTELLIGENCE LTD, Sidcup (GB)

( * ) Notice: Subject to any disclaimer, the term of this patent is extended or adjusted under 35 U.S.C. 154(b) by 174 days.

(21) Appl. No.: 16/119,506

(22) Filed: Aug. 31, 2018

(65) Prior Publication Data

US 2019/0081989 A1 Mar. 14, 2019

Related U.S. Application Data

(60) Provisional application No. 62/553,473, filed on Sep. 1, 2017.

(51) Int. Cl.
*H04L 29/06* (2006.01)
*G06Q 40/06* (2012.01)

(52) U.S. Cl.
CPC ........... *H04L 63/306* (2013.01); *G06Q 40/06* (2013.01); *H04L 63/302* (2013.01); *H04L 63/308* (2013.01)

(58) Field of Classification Search
CPC ..... G06Q 40/06; H04L 63/302; H04L 63/306; H04L 63/308
See application file for complete search history.

(56) References Cited

U.S. PATENT DOCUMENTS

| | | | | |
|---|---|---|---|---|
| 7,644,088 B2* | 1/2010 | Fawcett | ............... | G06Q 10/063 707/796 |
| 7,917,532 B1* | 3/2011 | Wisilosky | .............. | G06Q 10/10 707/783 |
| 8,176,062 B2* | 5/2012 | Fife | ..................... | G06F 16/2452 707/756 |
| 8,307,427 B1* | 11/2012 | Wisilosky | ............... | G06F 21/16 707/781 |
| 9,503,535 B2* | 11/2016 | Desai | .................... | H04L 67/306 |
| 9,613,190 B2* | 4/2017 | Ford | ....................... | G06F 21/10 |
| 9,762,553 B2* | 9/2017 | Ford | ....................... | G06F 21/10 |
| 10,033,702 B2* | 7/2018 | Ford | ....................... | H04L 63/083 |
| 10,560,457 B2* | 2/2020 | Anderson | ........... | G06F 16/2282 |
| 2005/0108262 A1* | 5/2005 | Fawcett, Jr. | ............ | G06F 16/20 |
| 2009/0271372 A1* | 10/2009 | Fife | ..................... | G06F 16/2452 |
| 2010/0121877 A1* | 5/2010 | Fawcett | .................. | G06F 16/20 707/769 |

(Continued)

*Primary Examiner* — Ranodhi Serrao
(74) *Attorney, Agent, or Firm* — Leason Ellis LLP

(57) ABSTRACT

A assimilated economic crime intelligence (AECI) system and method, comprising a first computer device that provides first entity data, and a web sector communicatively coupled to the first computer device. The web sector receives first entity data from the first computer device and sends the first entity data to a case comparator sector that compares the first entity data against second entity data in a database dedicated to a second computer device to determine a degree of matchability, wherein the web sector generates and sends a display signal to the first computer device to display a graphic user interface with the degree of matchability, without sharing the first entity data with the second computer device or the second entity data with the first computer device.

18 Claims, 9 Drawing Sheets

(56) References Cited

U.S. PATENT DOCUMENTS

| | | | |
|---|---|---|---|
| 2012/0203569 A1* | 8/2012 | Altman | G06Q 50/22 |
| | | | 705/3 |
| 2013/0097261 A1* | 4/2013 | Baer | H04L 51/12 |
| | | | 709/206 |
| 2013/0238706 A1* | 9/2013 | Desai | H04L 67/306 |
| | | | 709/204 |
| 2015/0163206 A1* | 6/2015 | McCarthy | H04L 63/104 |
| | | | 713/171 |
| 2015/0310188 A1* | 10/2015 | Ford | H04L 63/0428 |
| | | | 726/28 |
| 2015/0339339 A1* | 11/2015 | Mastrodonato | G06F 16/214 |
| | | | 707/805 |
| 2016/0078191 A1* | 3/2016 | Casimiro | G06F 19/3418 |
| | | | 705/3 |
| 2016/0269411 A1* | 9/2016 | Malachi | H04L 63/10 |
| 2017/0032334 A1* | 2/2017 | Martinez | G06Q 50/163 |
| 2017/0041296 A1* | 2/2017 | Ford | H04W 12/06 |
| 2017/0142076 A1* | 5/2017 | Ford | G06F 21/10 |
| 2017/0171214 A1* | 6/2017 | Anderson | H04L 63/104 |
| 2018/0218384 A1* | 8/2018 | Cook | G06Q 30/0204 |
| 2018/0365333 A1* | 12/2018 | Semlani | G06F 16/904 |

\* cited by examiner

ASSIMILATED ECONOMIC CRIME INTELLIGENCE SYSTEM AND METHOD

CROSS REFERENCE TO RELATED APPLICATION

This application claims priority to and the benefit of U.S. Provisional Patent Application No. 62/553,473, filed Sep. 1, 2017, which is incorporated herein by reference in its entirety.

FIELD OF THE DISCLOSURE

The present disclosure relates to a system and a method that facilitates information sharing between two or more computers, and, more particularly, a system and method that facilitates collaboration with two or more computers and creation of one or more investigation groups.

BACKGROUND OF THE DISCLOSURE

The scale of financial crimes being committed has reached unmanageable levels. Current legislation is driving entities to take greater responsibility for investigating financial crimes and assisting law enforcement. According to the PWC Global Economic Survey 2016, 44% of stakeholders believe local law enforcement is not adequately resourced and responsibility for fighting economic crime is largely left to financial organizations. The global financial crime industry is estimated to be worth around $2.4 trillion a year, according to City AM.

Historically, financial crime intelligence data has only been shared with law enforcement, thereby mitigating concerns relating to sharing of intelligence relating to individuals. Limited intelligence sharing takes place via SAFOs (Specified Anti-Fraud Organizations) but intelligence is seldom shared directly from one FIC (fraud investigator computer) to another FIC.

Conventional intelligence sharing hubs, including those owned by certain SAFOs, invite users to submit a package of intelligence which is then shared with all other users as appropriate via a central database. Various other intelligence sharing platforms exist. For instance, banks are known to share intelligence via the JMLIT (Joint Money Laundering Intelligence Taskforce). However, such intelligence sharing about individuals who have not been convicted of an offense presents risks to the sharing entities.

The disclosure provides a novel system and method that overcome the disadvantages discussed above, and that meet an unfulfilled need for sharing intelligence data amongst different FICs.

SUMMARY OF THE DISCLOSURE

According to an aspect of the disclosure, a non-transitory computer-readable storage medium is provided, storing computer-executable instructions that, when executed by one or more processors, cause the one or more processors to: initiate a communication session with a first computer device over a communication link; receive a settings instruction signal and a settings data signal from the first computer device over the communication link; parse received entity data from the settings data signal; query a database that includes stored entity data dedicated to a second computer device and receive queried entity data dedicated to the second computer device; compare the received entity data against the queried entity data; determine a degree of matachability of the received entity data to said queried entity data; and generate and transmit, via the communication link, a display signal to a graphic user interface at the first computer device to display a case card, wherein the case card comprises one or more fields populated with the received entity data and an indication of matchability without identifying the queried entity data or the second computer device.

The non-transitory computer-readable storage medium may further store computer-executable instructions that, when executed by one or more processors, cause the one or more processors to decrypt the received entity data.

The received entity data may include a name, a gender, an address, or a telephone number.

The non-transitory computer-readable storage medium may further comprise computer-executable instructions that, when executed by one or more processors, cause the one or more processors to store the received entity data in a database dedicated to the first computer device.

The settings instruction signal may comprise a compare activation instruction signal that instructs the one or more processors to activate/deactivate an instruction tag in a database dedicated to the first computer device. The instruction tag may indicate whether the received entity data is comparable in response to a query from another computer device.

The setting instruction signal may comprise a collaboration select signal that instructs the one or more processors to create or update an available/unavailable instruction tag that indicates the associated case record is available to an investigation group comprised of one or more other computer devices.

The setting instruction signal may comprise a collaboration status instruction signal that instructs the one or more processors to create or update an FIC available/unavailable instruction tag that indicates that the first computer device is available to participate in an investigation group comprised of one or more other computer devices.

The setting instruction signal may comprise a disclose instruction signal that instructs the one or more processors to create or update a disclose instruction tag that indicates that the received entity data is disclosable by one or more other computer devices.

According to a further aspect of the disclosure, a method is provided, comprising: initiating a communication session with a first computer device over a communication link; receiving a settings instruction signal and a settings data signal from the first computer device over the communication link; parsing received entity data from the settings data signal; querying a database that includes stored entity data dedicated to a second computer device and receiving queried entity data dedicated to the second computer device; comparing the received entity data against the queried entity data; determining a degree of matachability of the received entity data to said queried entity data; and generating and transmitting, via the communication link, a display signal to a graphic user interface at the first computer device to display a case card, wherein the case card comprises one or more fields populated with the received entity data and an indication of matchability without identifying the queried entity data or the second computer device. The method may further comprise decrypting the received entity data. The method may further comprise storing the received entity data in a database dedicated to the first computer device.

According to a still further aspect of the disclosure, a system is provided for comparing and matching first entity data received from a first computer device with second entity data received from a second computer device without sharing any of the first entity data with the second computer device or the second entity data with the first computer device. The system comprises: a web sector that communicates with the first computer device to receive the first entity data; and a case comparator sector that compares the received first entity data to the second entity data stored in a database dedicated to the second computer device to determine a degree of matchability of the first entity data to the second entity data, wherein the case comparator sector generates and sends the determined degree of matchability to the web sector, and wherein the web sector generates and sends a case card to the first computer device that comprises one or more fields populated with the first entity data and the determined degree of matchability without identifying the second entity data or the second computer device.

The system may further comprise: a case management sector that handles creation and editing of a case record in the database dedicated to the second computer device; and a case collaboration sector that handles creation and editing of an investigation group comprised of at least the first computer device and the second computer device.

Additional features, advantages, and embodiments of the disclosure may be set forth or apparent from consideration of the detailed description and drawings. Moreover, it is to be understood that the foregoing summary of the disclosure and the following detailed description and drawings are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and, together with the detailed description, serve to explain the principles of the disclosure. No attempt is made to show structural details of the disclosure in more detail than may be necessary for a fundamental understanding of the disclosure and the various ways in which it may be practiced. In the drawings.

Figure 1:
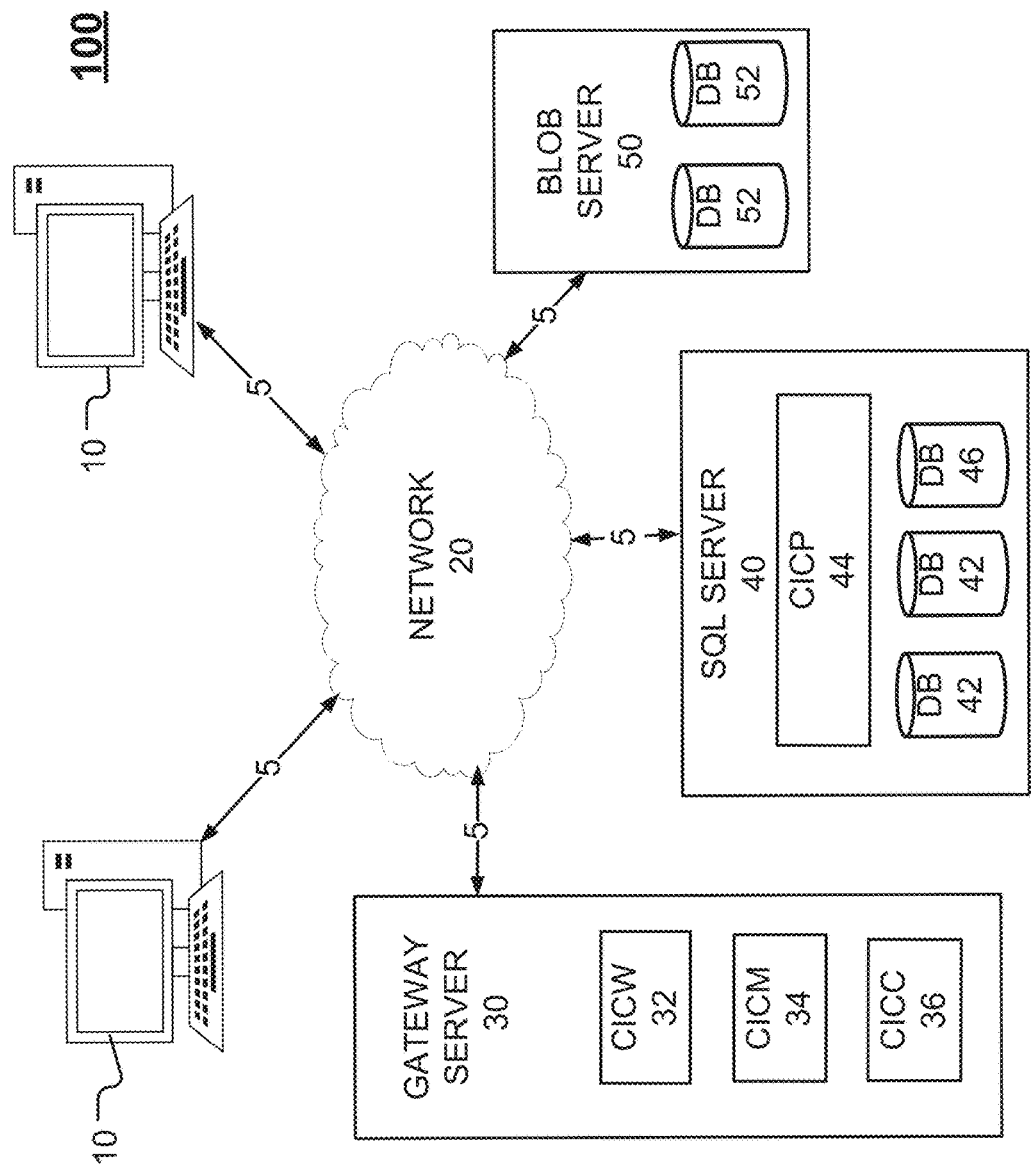
FIG. 1 shows an example of a AECI system, constructed according to the principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 shows an example of an assimilated economic crime intelligence (AECI) system 100, constructed according to the principles of the disclosure. The AECI system 100 includes one or more fraud investigator computers (FICs) 10, a network 20, and a gateway server 30. The AECI system 100 may include a case server 40 and a binary large object (BLOB) server 50. Each of the components in the AECI system 100 may be connected by one or more communication links 5.

The gateway server 30, case server 40, and BLOB server 50 may be provided as a single integrated system housed in a single, common location, or multiple locations, and that communicate and work together, as described herein. The gateway server 30, case server 40, and BLOB server 50 may be provided in a single server, or multiple servers, as shown in FIG. 1.

The gateway server 30, case server 40, and BLOB server 50 may be provided as multiple distinct systems that communicate and work together, as described herein.

The FIC 10 may include the device 200 shown in FIG. 2, discussed below. The gateway server 30 may include a web (CICW) sector 32 that may be accessed by each FIC 10 over the network 20 and one or more communication links 5. The case server 40 may include one or more databases 42 that hold case intelligence, which may be stored as case records in the databases 42. The BLOB server 50 may include one or more databases 52 that hold case intelligence information such as, for example, image data, document data, compressed data, and the like. The AECI system 100 is configured to communicatively connect to each FIC 10 and establish a communication session with each FIC 10 over communication links 5.

Referring to FIG. 1, the gateway server 30 may include one or more CICW sectors 32 that may be accessed by the one or more FICs 10 via communication links 5 and the network 20. The gateway server 30 may further include one or more case management (CICM) sectors 34, and a case collaboration (CICC) sector 36, which handles and manages all aspects of collaboration with respect to a particular FIC 10 or group of FICs 10. The CICM sector 34, which handles and manages all aspects of case record creation and maintenance in a database 42 (and/or database 52) for a particular FIC 10, may be comprised in the CICW sector 32. The case server 40 may include a case comparator (CICP) sector 44.

The CICM sector 34 and/or CICC sector 36 may alternatively (or additionally) reside in the case server 40.

The gateway server 30 (and/or case server 40) may include a unique and separate CICM sector 34 for each FIC 10 in the AECI system 100. The CICM sector 34 may have direct access to the case server 40 and/or BLOB server 50. The gateway server 30 may be configured to carry out the processes described in FIGS. 3-7. The CICW sector 32, CICM sector 34, CICC sector 36, and CICP sector 44 may each include a computer readable medium that embodies computer readable sections or segments of code that, when executed by one or more processors in, for example, the gateway server 30 and/or case server 40, cause the processes described herein to be executed and carried out. Each sector 32, 34, 36, 44 may include a web-based computer program or application that may reside in the gateway server 30 and/or case server 40.

The case server 40 may include a unique database 42 associated with each FIC 10. The case server 40 may include a common database 46 that stores, for example, login data, user data, data unique to each FIC 10 in the AECI system 100 (e.g., Internet Protocol (IP) address, Media Access Control (MAC) address, Internet Service Provider information, and the like), pointer data to matches, and the like. The unique databases 42 may store, for example, user data (e.g., company data) for each FIC 10, case records for the respective FIC 10, entity records for the respective FIC 10, and the like. The databases 42, 46 in the case server 40 may include one or more relational databases, including a relational database management system (RDBMS) or a relational data stream management system (RDSMS). The case server 40 may be configured to execute SQL (Structure Query Language) or any other domain-specific computer language, as understood by those skilled in the art.

The BLOB server 50 may include a BLOB (Binary Large Object) storage. The BLOB server 50 may include one or more databases 52, each of which may be dedicated to an individual FIC 10. Each database 52 may include, for example, user data (e.g., company data) for the respective FIC 10, uploaded (or downloaded) documents for the respective FIC 10, uploaded (or downloaded) data (or information) for the respective FIC 10, and the like.

Figure 2:
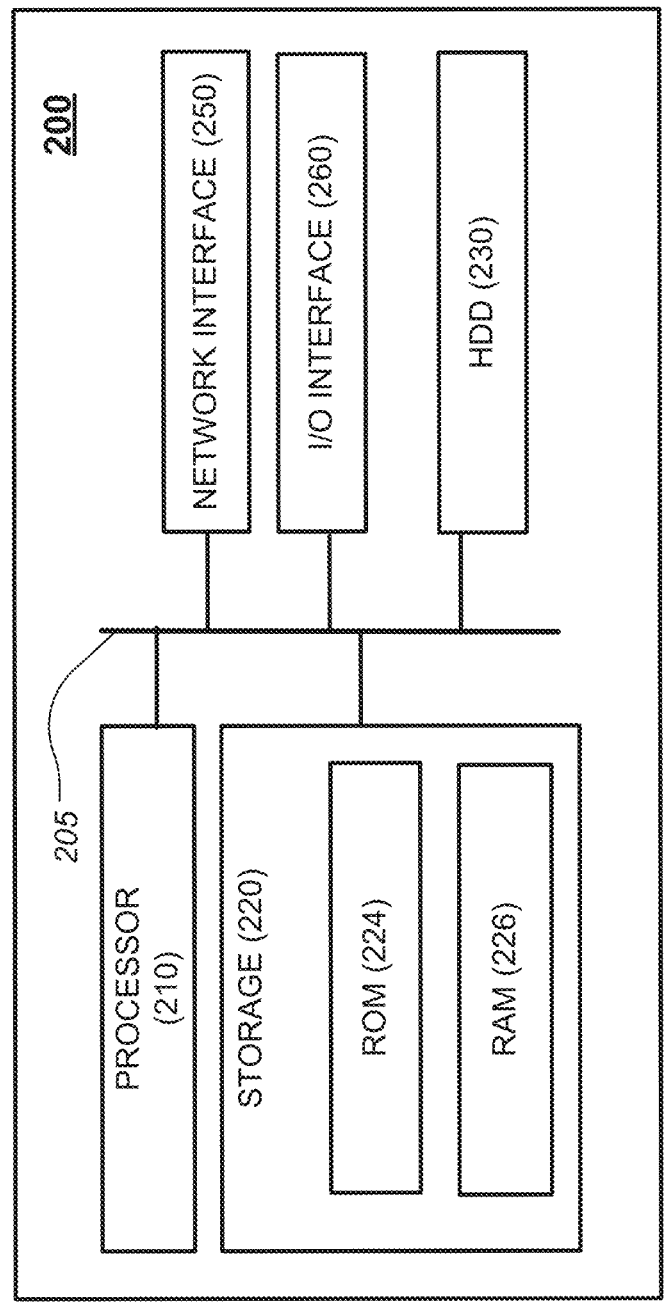
FIG. 2 shows an example of a device that may be included in each FIC or the AECI system.

FIG. 2 shows an example of a device 200 that may be included in each FIC 10 and/or servers 30, 40, and/or 50. The device 200 is configured to implement the various aspects of the FIC 10 (or servers 30-50). The device 200 includes a processor 210, a device storage 220, an HDD (hard disk drive) 230, a network interface 250, an I/O (input/output) interface 260, and a bus 205. The bus 205 couples the device components including, but not limited to, the device storage 220, the HDD 230, the network interface 250 and the I/O interface 260 to the processor 210. The processor 210 can be any of various commercially available processors. Dual microprocessors and other multi-processor architectures may also be employed as the processor 210.

The system bus 205 can be any of several types of bus structures that may further interconnect to a memory bus (with or without a memory controller), a peripheral bus, and a local bus using any of a variety of commercially available bus architectures.

The device storage 220 includes a read only memory (ROM) 224 and a random access memory (RAM) 226. A basic input/output system (BIOS) may be stored in the ROM 224, which may include a non-volatile memory, such as, for example, ROM, EPROM, EEPROM, or the like. The BIOS contains the basic routines that help to transfer information between elements within the device 200 (and FIC 10 or servers 30-50), such as during start-up. The RAM 226 may include a high-speed RAM such as static RAM for caching data.

The HDD 203 may include an internal hard disk drive, such as, for example, an enhanced integrated drive electronics (EIDE) drive, a serial advanced technology attachments (SATA) drive, or the like. The HDD 230 may be configured for external use in a suitable chassis (not shown). The HDD 230 can be connected to the system bus 205 by a hard disk drive interface (not shown). The hard disk drive interface (not shown) may include a Universal Serial Bus (USB) (not shown), an IEEE 1394 interface (not shown), and the like, for external applications.

The HDD 230 and its associated computer-readable media may provide nonvolatile storage of data, data structures, computer-executable instructions, and the like. The HDD 230 may accommodate the storage of any data in a suitable digital format.

Computer instructions for carrying out the method disclosed herein can be stored in the HDD 230 and/or RAM 226, including an operating system (not shown), one or more application programs (not shown), other program modules or sectors (not shown), and program data (not shown). Any (or all) of the operating system, application programs, program modules, and program data may be cached in the RAM 226.

The device 200 may receive instruction and data signals via the I/O interface 260, which may be communicatively coupled via communication links 5 to one or more input/output devices, including, for example, a keyboard (not shown), a mouse (not shown), a pointer (not shown), a microphone (not shown), a speaker (not shown), a display (not shown), and/or the like. The received instruction and data signals may be forwarded to the processor 210 from the I/O interface 260 via the bus 205. The device 200 may communicate (e.g., transmit/receive) instruction and data signals via an internal transceiver (not shown).

The device 200 may be coupled to a display device and/or a sound reproduction device (not shown), such as, for example, a speaker (not shown) or an interactive voice response (IVR) device (not shown).

The display device may be connected to the system bus 205 via the I/O interface 260. The display device may be connected to a video driver (not shown) via the system bus 205. The sound reproduction device (not shown) may be connected to the system bus 205 via the I/O interface 260. The sound reproduction device (not shown) may be connected to an audio driver (not shown) via the system bus 205.

The network interface 250 may be connected to the network 20 (shown in FIG. 1). The network interface 250 may include a wired or a wireless communication network interface (not shown) and/or a modem (not shown). When used in a local area network (LAN), the device 200 may be connected to the LAN network through the wired and/or wireless communication network interface; and, when used in a wide area network (WAN), the device 200 may be connected to the WAN network through the modem. The modem (not shown) can be internal or external and wired or wireless. The modem may be connected to the system bus 205 via, for example, a serial port interface (not shown).

Figure 3:
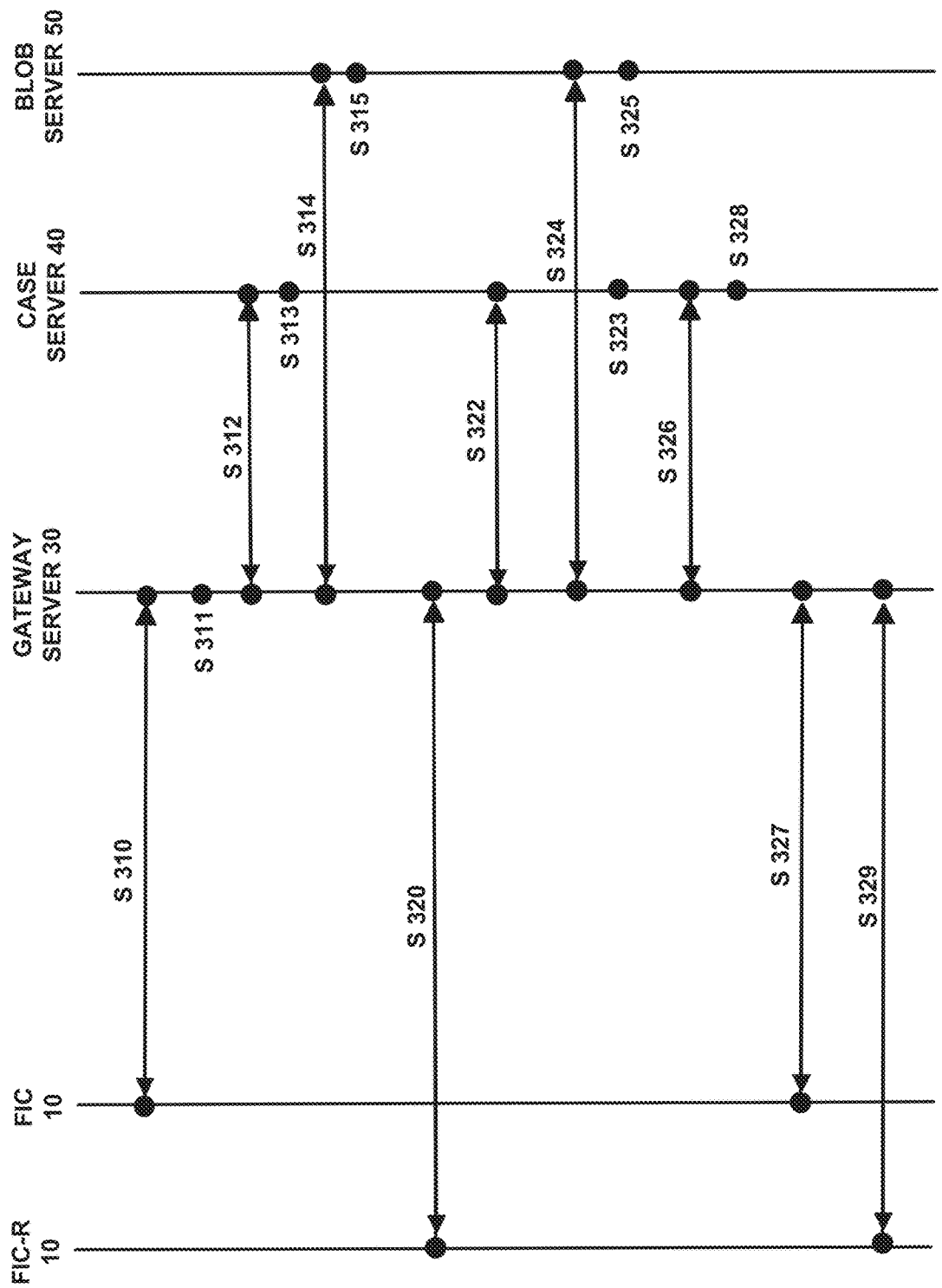
FIG. 3 shows an example of a multi-client architecture that may be included in the AECI system.

FIG. 3 shows a non-limiting embodiment of a multi-client architecture and process that may be included in the AECI system 100. Referring to FIGS. 1 and 3, a plurality of FICs 10 may be communicatively coupled with the gateway server 30 via the CICW sector 32, which, as previously noted, may reside in the gateway server 30. The gateway server 30 may have a CICW sector 32 and/or CICM sector 34 dedicated to each of the FICs 10. The CICW sector 32 and/or the CICM sector 34 may reside external to the gateway server 30. As previously noted, the CICM sector 34 may be comprised in the CICW sector 32.

The multi-client architecture and process may further include the CICC sector 36, which may reside in the gateway server 30, or elsewhere. The CICC sector 36 may facilitate creation and management of collaboration groups. The CICC sector 36 may control access to the collaboration group by one or more FICs 10.

The multi-client architecture and process may further include a CICP sector 44, which may reside in the case server 40, or elsewhere. The CICP sector 44 may be tasked with receiving fraud investigation (FI) requests, generating entity data queries and sending the entity data queries to the databases 42, 46 and/or BLOB server 50. The received FI requests may include known entity data. The CICP sector 44 may be further tasked with receiving related entity data (e.g., supplied in response to the entity data queries) from databases 42 dedicated to other FICs 10 and comparing the known entity data against the received related entity data to determine a degree of matchability. The known entity data may be received from the gateway server 30, which in-turn may have received the known entity data from an FIC 10 via communication link 5.

Each of the FICs 10 may be communicatively coupled, via gateway server 30, to its respective database 42 in the case server 40. Each FIC 10 may be communicatively coupled, via gateway server 30 and/or case server 40 to its respective database 52 in the BLOB server 50. Each of the databases 42 and/or 52 may be communicatively coupled to the CICC sector 36.

The process seen in FIG. 3 is a non-limiting embodiment of a process that may be carried out by the AECI system 100. Each of the steps S310 through S329 of the process may include a corresponding section or segment of computer code that is stored in a computer readable medium that, when executed by one or more processors, cause the steps S310 through S329 to be carried out.

Referring to FIGS. 1 and 3, the process may be carried out by the CICW sector 32 in coordination with the CICM sector 34, CICC sector 36 and/or the CICP sector 44, in the AECI system 100. After a communication session is opened between an FIC 10 and the gateway server 30 over a communication link 5, the CICW sector 32 may begin communicating with the FIC 10 and receive settings instruction signals and settings data signals from the particular FIC 10 (S310). The settings instruction signals may include, for example, an compare activation instruction signal (e.g., an activate/deactivate instruction tag indicating whether data in the associated case record may be compared against), a collaboration select signal (e.g., an available/unavailable instruction tag indicating whether the associated case record may be made available to an investigation group), a collaboration status instruction signal (e.g., an FIC available/unavailable instruction tag indicating whether the particular FIC 10 is available or not to participate), and/or a disclose instruction signal (e.g., a disclose/withhold instruction tag indicating whether information in an associated case record may be disclosed by other FICs). In this regard, the CICW sector 32 may coordinate with the CICM sector 34 for the particular FIC 10 (S311). The FIC 10 may receive settings and data from a user via, e.g., I/O interface 260 (shown in FIG. 2), or from a device (not shown) via, e.g., network interface 250 or I/O interface 260 (shown in FIG. 2), which the FIC 10 can then send in the form of settings instruction signals and settings data signals to the CICW sector 32 to identify or select specific industries and/or financial institutions for which data comparisons might be executed by the AECI system 100 for the particular FIC 10. If the settings instruction signals and settings data signals received from the FIC 10 (S310) do not specify any industries/organizations/institutions/etc., then the received instruction and data signals can be used internally by the CICM sector 34 dedicated to the particular FIC 10 (S311).

The CICW sector 32 may communicate with the FIC 10 to receive case creation/edit instruction signals and case creation/edit data signals from the particular FIC 10 (S310). The case creation/edit instructions and data included in the received signals may be communicated to the CICM sector 34 for the specific FIC 10 (S311), which in turn can cause case records to be created or updated in the database 42 in the case server 40 (S312) and/or the database 52 in the BLOB server (S314). Based on the received case creation/edit instructions and case creation/edit data, case records may be created or edited (e.g., updated, deleted, added, modified) and/or stored in the database 42 in the case server 40 for the particular FIC 10 (S313). BLOB records may be created or edited (e.g., updated, deleted, added, modified) and/or stored in the database 52 in the BLOB server 50 for the particular FIC 10 (S315). Based on the case creation/edit instructions, which may include instructions to make the case record available or unavailable for collaboration with external FICs 10, the CICW sector 32 may render the associated case records in the associated database 42 either available or unavailable for collaboration with external FICs 10 (S313). The default may be that all case records in the associated database 42 are made available for collaboration, unless instructions to the contrary are received from the applicable FIC 10. The foregoing process (S310 to S315) may be carried out for each FIC 10 in the AECI system 100.

The CICW sector 32 may communicate with the FIC 10 to receive entity add/edit instructions and entity data from the FIC 10 (S310). In this regard, the FIC 10 may receive or generate/edit entity profiles, based on which the FIC 10 may then send entity add/edit instructions and entity data to the CICW sector 32 (S310). The entity data may include an entity profile for a particular entity. The entity data may include information about the entity, including, for example, the entity's identity (e.g., name, address, telephone number, identification number, passport number, driver license number, next of kin, etc.), the entity's physical characteristics (e.g., height, weight, age, sex, hair color, eye color, etc.), or any other information that may be helpful in identifying the entity or providing information about the entity. Based on the received entity add/edit instructions and entity data, the CICW sector 32 can add existing (or new or modified) entity profiles to new or existing case records (S311).

The AECI system 100 may provide each FIC 10 with the ability to attach existing entity profiles to new case records, where appropriate. Each entity profile is owned by the FIC 10 that created it. Therefore, an entity profile can only be amended/updated with the consent of the existing profile owner FIC 10.

The CICW sector 32 may communicate with a particular FIC 10, such as, for example, FIC-R 10 (S320) to receive compare entity selection instructions and compare entity selection data (S320). The received compare entity selection instructions may include an instruction to select or deselect specific entities where, for example, certain sensitivities may exist. The compare entity selection data may include the identity of the entity. The received compare entity selection instructions may be forwarded to the case server 40 (S322) and/or BLOB server 50 (S324). If a specific entity is deselected, then the entity data will not be entered into the common database 46 (S323) and, therefore, no matching to other case records will take place. According to a non-limiting embodiment, only select FICs 10 may be given the ability to deselect the compare entity field for specific entities.

The CICW sector 32 may communicate with the FIC-R 10 to receive document data from the particular FIC-R 10 (S320). The received document data may include, for example, attachments that are received from the FIC-R 10 to be attached to or associated with the case record, including, for example, suspicious documents in the database 42 (S323). The received document data may include documents that have been redacted, such as, for example, by the FIC-R 10. The suspicious documents may be shared with external FICs 10 via dedicated CICW sectors 32 and the CICC sector 34.

The AECI system 100 may include a suspicious document library for each FIC 10. This library may be kept in the database 42 dedicated to the particular FIC 10 in the case server 40 and/or the database 52 in the BLOB server 50. The FICs 10 can attach or associate documents via the CICM sector 32 (S323) such as fictitious ID, share certificates in a separate section of the individual case record, or the like, for internal purposes. The documents can be stored in the database 42 (S323) and/or forwarded to the BLOB server 50 and stored in the database 52 (S325). The FICs 10 can share redacted versions of the suspicious documents with other FICs 10 via dedicated CICW sectors 32 and the CICC sector 36 by removing certain information such as, for example, personal/sensitive information and selecting a "share" field. The documents can then be searched by the CICP sector 44 in the case server 40 and forwarded to the other FICs 10 via dedicated CICW sectors 32 and the CICC sector 36 (S327).

The FIC 10 may save the case record locally at the FIC 10 (e.g., in storage 220, shown in FIG. 2), and/or send instructions to the CICW sector 32 to save the case record in the database 42 (S323) and/or the database 52 (S325) dedicated to the particular FIC 10. The FIC 10 may encrypt some or all instruction and data signals communicated to the CICW sector 32, including case record data (including entity data) before it sends it to the CICW sector 32 (S310 or S320). The received instructions and data (including entity data) may be decrypted at the gateway server 30 and/or case server 40 before it is stored in the dedicated database 42, or it may be stored in encrypted form and later decrypted, as necessary.

The entity data received by the CICW sector 32 from the FIC 10 (S310 or S320) may be forwarded to the CICP sector 44 (S322), where the received entity data may be compared against entity data received from other FICs 10 (S323) and stored in their respective, dedicated databases 42 (S323). Case records that are found to be matching may be filtered and sorted/prioritized according to one or more predetermined rules (e.g., primary, secondary, etc. rules) (S323). The rules may be set to distinguish case card records and entity data records that are highly likely to be an exact match from potential false positives. For instance, the rule can be set to give minimal or no weight to a company name that is ubiquitous in a particular industry. Primary and secondary rules may be simply based on single or combination data fields. The weighting may simply relate to whether a relevant data field(s) constitutes a primary or a secondary rule, either on a singular or a combined basis. The AECI system 100 is designed in an agile way and could be adapted to add specific weightings to specific data fields or actual data itself, which can be carried out by, for example, machine intelligence.

The CICW sector 32 may provide an FIC 10 with an activation/deactivation selector for a compare entity field (S310 or S320). The selected compare entity field may be received as a compare activation instruction signal. For instance, a case record may contain a blue-chip multinational entity which is not a suspect or a victim and whose clients are subject to multiple fraud attempts. Such an entity would result in an inordinate number of connections solely on the basis of the name of the multinational entity. This may not add value to the investigative process and may in fact create significant noise. Accordingly, one or more of the entity data fields may be activated or deactivated based on the received compare activation instruction signal, so as to maximize accurate matching of entity data.

According to one non-limiting embodiment, a requesting FIC-R 10 may initiate a communication session with the gateway server 30 and send a case comparison request signal via communication link 5 to the CICW sector 32 (S320). The gateway server 30 in-turn may initiate a communication session with the case server 40 (S322) and/or BLOB server 50 (S324), and the CICW sector 32 may forward the comparison request signal (S322) to the CICP sector 44, either directly or via the CICC sector 36. The CICP sector 44 may query one or more of the databases 42 (S323) and/or databases 52 (S325) based on the comparison request signal. A search request may be launched by the CICP sector 44 with the known data received from the CICW sector 32, which in-turn may have been received from the requesting FIC-R 10, and/or known data received from an entity data record in the database 42 dedicated to the requesting FIC-R 10 (S323). The CICP sector 44 may compare the received known entity data against query results received from one or more databases 42 dedicated to one or more respective FICs 10 (S323). The CICP sector 44 may temporarily buffer the entity data from the CICP sector 44 (or dedicated database 42) and the queried one or more databases 42, and compare the buffered entity data to determine a degree of matchability (S323). Based on the comparison of known data, the CICP sector 44 may return only known matching data to the CICW sector 32 (S326) to be forwarded to the FIC-R 10 (S329) and/or the database 42 dedicated to the FIC-R 10 (S328).

Figure 4:
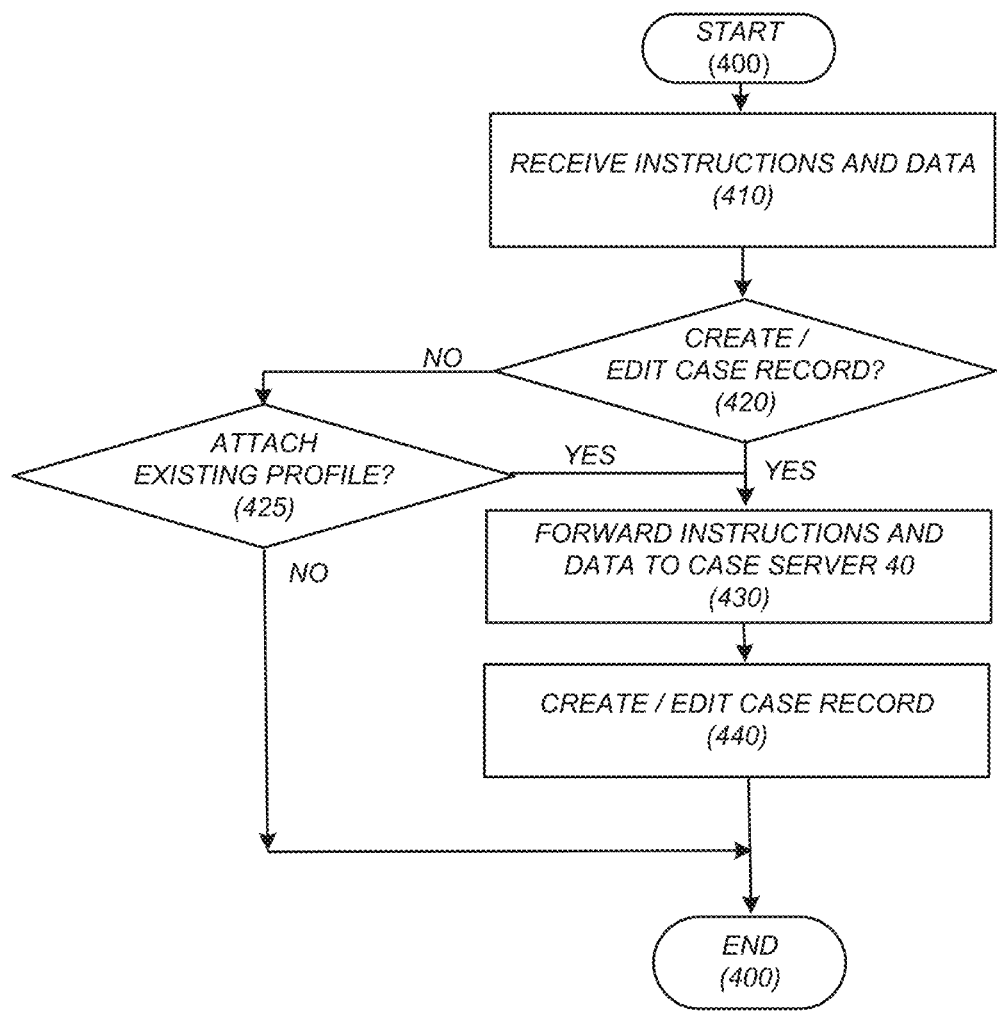
FIG. 4 shows an example of a setup process that may be carried out by the AECI system.

FIG. 4 shows a non-limiting embodiment of a setup process 400 that may be carried out by the AECI system 100. Each of the Steps 410 through 440 of the process may include a section or segment of computer code that is stored in a computer readable medium that, when executed by one or more processors, causes each of the steps to carried out.

Referring to FIGS. 1 and 4, the process 400 may be carried out by the CICW sector 32 in coordination with the CICM sector 34 in the gateway server 30. The CICW sector 32 may begin by communicating with an FIC 10 over a communication link 5 and receiving settings instructions and settings data from the particular FIC 10 (Step 410). In this regard, the CICW sector 32 may coordinate with the CICC sector 34 for the particular FIC 10. A user may enter settings via the FIC 10, which the FIC 10 can then send in the form of settings instructions and settings data to the CICW sector 32 (Step 410) to identify or select specific industries and/or financial institutions for which data comparisons might be executed by the AECI system 100 for the particular FIC 10. If the settings instructions and settings data received from the FIC 10 does not specify any industries/organizations/institutions/etc., then the received data can be used internally by the CICM sector 34 dedicated to the particular FIC 10.

The CICW sector 32 may communicate with the FIC 10 to receive case record creation/edit instructions and case record creation/edit data from the particular FIC 10, which may be used to populate the dedicated database 42 and/or database 52 (Step 410). If case record creation/edit instructions and data are received (YES at Step 420), then the case record creation/edit instructions and data may be communicated to the CICM sector 34 for the specific FIC 10 (Step 430) and the database 42 (and/or database 52) associated with the FIC 10 may store or edit an associated case record with the case record creation/edit instructions and data (Step 440). Based on the received case record creation/edit instructions and case record creation/edit data, case records may be created or edited (e.g., updated, deleted, added, modified) and stored in the database 42 in the case server 40 (Step 440) for the particular FIC 10. Based on the case record creation/edit instructions, which may include instructions to make the case record available or unavailable for collaboration with external FICs 10, the CICW sector 32 (and/or CICM sector 34) may render the associated case records either available or unavailable for collaboration with external FICs 10 (Step 440). The default may be that all case records are made available for collaboration, unless instructions to the contrary are received from the applicable FIC 10.

The CICW sector 32 may communicate with the FIC 10 at Step 410 to receive entity add/edit instructions and entity data from the FIC 10. In this regard, the FIC 10 may receive or generate/edit entity profiles, based on which the FIC 10 may then send entity add/edit instructions and entity data to the CICW sector 32 (Step 410). The entity data may include an entity profile for an entity. The entity data may include information about the entity, including, for example, the entity's identity (e.g., name, address, telephone number, identification number, passport number, driver license number, next of kin, etc.), the entity's physical characteristics (e.g., height, weight, age, sex, hair color, eye color, etc.), or any other information that may be helpful in identifying the entity or providing information about the entity. Based on the received entity add/edit instructions and entity data, the CICW sector 32 (and/or CICM sector 34) can add or associate existing (or new or modified) entity profiles to new or existing case records (Step 440).

The AECI system 100 may provide each FIC 10 with the ability to attach or associate existing entity profiles to new case records, where appropriate. Entity profiles that can be attached to a new case may include, for example, an entity profile that already exists and is already "owned" by the FIC that created a new or separate existing case record, or an existing profile for a convicted fraudster that may be added to a new or separate existing case record by an FIC 10 other than the owner of the original convicted fraudster profile (e.g., an FIC of an investigator who is not the owner), in which case the new case owner FIC may not have the right to amend the profile after adding it to the new or separate existing case record. The CICW sector 32 may determine whether to attach an existing entity profile to a new case record (Step 425) based on the instructions received from the FIC 10. Each entity profile is owned by the FIC 10 that created it. Therefore, an entity profile can only be amended/updated with the consent or at the instruction of the existing profile owner FIC 10, except, for example, where the entity profile is a convicted fraudster profile, in which case the FIC 10 owner cannot amend or edit the profile. If a determination is made that an existing entity profile is to be attached to, or associated with a new case record (YES at Step 425), then instructions and data are sent to the case server 40 (Step 430) and a new case record is created and attached to or associated with the existing entity profile (Step 440).

According to a non-limiting embodiment of the disclosure, the AECI system 100 may provide one or more FICs 10 with the ability to clone an existing profile type and attach it to a new or existing case record associated with, or for which the particular FIC 10 is responsible. Thereafter, the cloned entity profile may be maintained as a separate entity profile from the entity profile from which it was cloned. The FIC 10 may be provided with a "Clone Entity" selector field, which, when selected by the FIC 10, may cause the particular FIC 10 to generate and communicate a clone entity instruction signal to the AECIW sector 32. The afore-noted convicted fraudster records may be excluded from the cloning feature.

Figure 5:
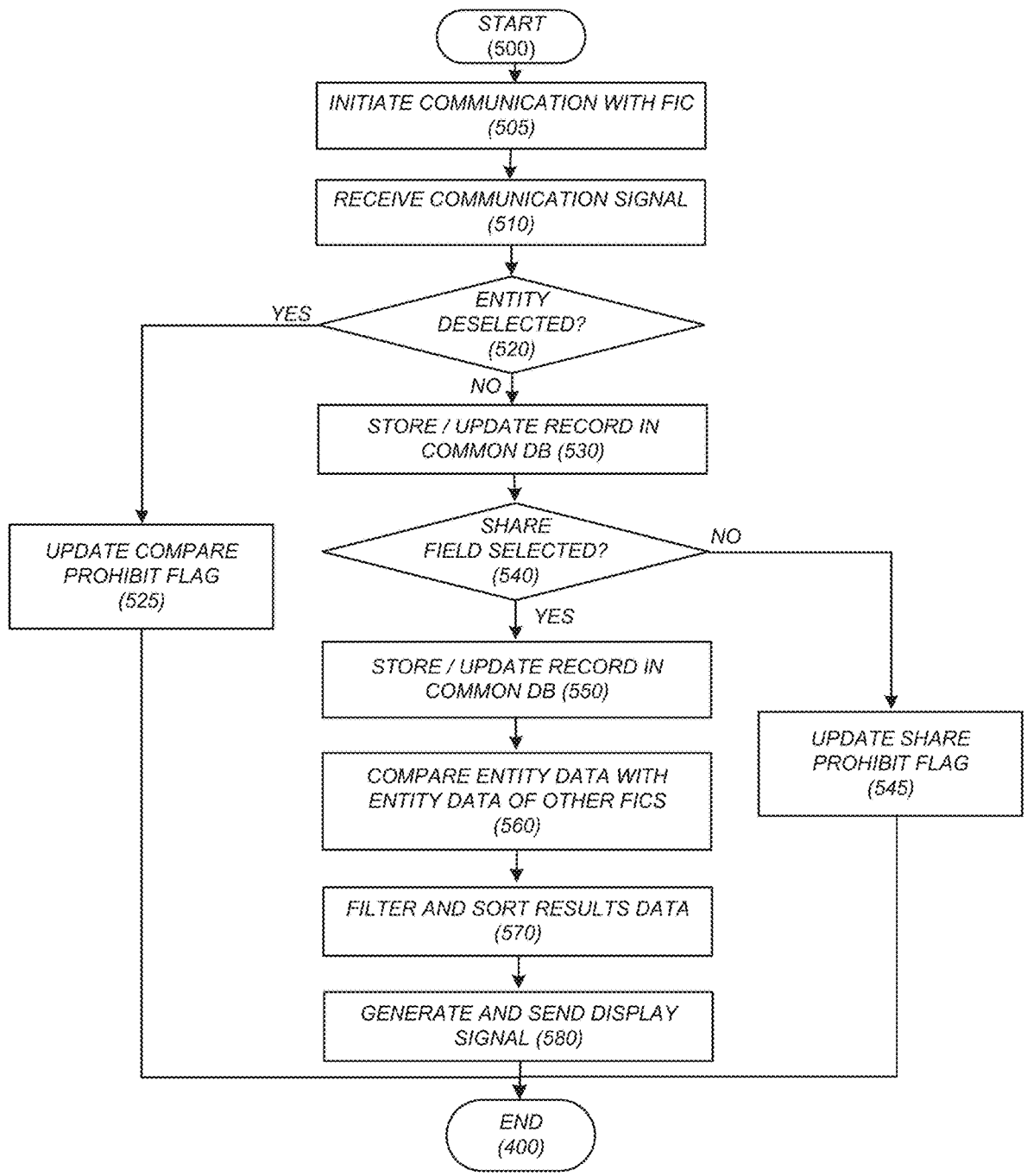
FIG. 5 shows an example of an inquiry process that may be carried out by the AECI system.

FIG. 5 shows a non-limiting embodiment of an inquiry process 500 that may be carried out by the AECI system 100. Each of the Steps 505 through 580 of the process may include a section or segment of computer code that is stored in a computer readable medium, which, when executed by one or more processors, cause each of the steps to be executed and carried out.

Referring to FIGS. 1 and 5, after an FIC 10 initiates communication with the gateway server 30 (Step 505), the CICW sector 32 may communicate with the FIC 10 to receive a communication signal from the FIC 10 (Step 510). The communication signal may include a compare request. The communication signal may include instructions and data. The received instructions and data may comprise compare entity selection instructions and compare entity selection data. The CICW sector 32 (and/or CICM sector 34) may determine whether the received compare entity selection instructions include an instruction to select or deselect specific entities where, for example, certain sensitivities may exist (Step 520). The compare entity selection data may include the identity of the entity.

If the received compare entity selection instructions include a deselect specific entity instruction (YES at Step 520), then the specific entity is deselected and an access prohibition flag may be set in the common database 46 record associated with the particular FIC 10, and the entity data may be prohibited from being shared with any other FIC 10 (Step 525). Where the entity data access prohibition flag is entered into the common database 46 (Step 525), the AECI system 100 may be configured such that no matching to other case records in databases 42 will take place. According to one embodiment, only select FICs 10 may be given the ability to deselect the compare entity field for specific entities.

The AECI system 100 may be configured such that there is never any personal entity data at rest in the common database 46, or any other location that might be accessible to any FIC 10 other than the owner of the data. The AECI system 100 may be configured so that the only data that is stored in the common database 46 is that pertaining to communications within an investigation group where the participating FICs 10 have all agreed to share information/intelligence with the other FICs 10 in the investigation group.

If, however, the compare entity select instructions do not include a deselect specific entity instruction (NO at Step 520), then the common database 46 record associated with the FIC 10 is updated (or created) to indicate that the entity data may be queried by, for example, the CICP sector 44 (Step 530).

The CICW sector 32 may communicate with the FIC 10 to receive document data from the particular FIC 10 (Step 510). The received document data may include, for example, attachments that are received from the FIC 10 to be attached to or associated with the case record in the database 42, including, for example, suspicious documents. The received document data may include documents that have been redacted, such as, for example, by the FIC 10. The suspicious documents may be shared with external FICs 10.

The AECI system 100 may include a suspicious document library for each FIC 10. This library may be kept in the database 42 dedicated to the particular FIC 10 in the case server 40. Alternatively (or additionally), the library may be kept in the database 52 in the BLOB server 50. The FIC 10 can attach documents such as fictitious ID, share certificates in a separate section of the individual case record in the associated database 42, or the like, for internal purposes. The FIC 10 can share redacted versions of suspicious documents with other FICs 10 by removing personal/sensitive information in the communication signal and selecting a "share" field in the instructions and data sent to the gateway server 30 (Step 510).

If it is determined that the share field is selected in the communication signal (YES at Step 540), then the associated record in the common database 46 may be updated (Step 550) to allow the documents to be searched for by the CICP sector 44 and made available to other FICs 10 for viewing on, for example, their respective displays. If, however, it is determined that the share field is not selected (NO at Step 540), then the associated record in the common database 46 may be updated with a do not share flag in the appropriate field of the associated record (Step 545).

The FIC 10 may save the case record locally at the FIC 10 (e.g., in storage 220, shown in FIG. 2) and/or send instructions to the CICW sector 32 to save the case record in the FIC's dedicated database 42 in the case server 40 (Step 530). The FIC 10 may encrypt entity data before it sends it to the CICW sector 32. The received entity data may be decrypted before it is stored in the dedicated database 42, or it may be stored in encrypted form and later decrypted, as necessary.

The entity data received by the CICW sector 32 (Step 510) may be forwarded to the CICP sector 44, where the received entity data may be compared against entity data stored in the common database 46 and/or databases 42 dedicated to other FICs 10 (Step 560). Case records that are found by the CICP sector 44 to include matching data may be filtered and sorted/prioritized according to one or more predetermined rules (e.g., primary or secondary rules) (Step 570). The rules may be set to distinguish case card records and entity data records that are highly likely to be an exact match from potential false positives. For instance, the rule can be set to give minimal or no weight to a company name that is ubiquitous in a particular industry.

The CICW sector 32 may provide an FIC 10 with an activation/deactivation selector for a compare entity field (Step 505). For instance, a case record may contain a blue-chip multinational entity which is not a suspect or a victim and whose clients are subject to multiple fraud attempts. Such an entity would result in an inordinate number of connections solely on the basis of the name of the multinational entity. This may not add value to the investigative process and may in fact create significant noise. Accordingly, the communication signal received from the FIC 10 may include activation/deactivation of one or more entity data fields, so as to maximize accurate matching of entity data.

Upon determining a match between the entity data received by the CICP sector 44 and entity data previously received from other FICs 10 and stored in respective databases 42 and/or 52 (Step 560), the CICP sector 44 may communicate with the CICW sector 32 to generate and send display instructions and display data to the FIC 10 from which the entity data was received in Step 510 (Step 580). The CICW sector 32 may also send the display instructions and display data to one or more of the other FICs 10 that contained matching entity data.

The display instructions may include markup language instructions, which may include, for example, HTML (HyperText Markup Language), SGML (Standard Generalized Markup Language), SVG (Scalable Vector Graphics), XML (Extensible Markup Language), XUL (XML User Interface Language), LaTeX, and the like. The display instructions may include scripting language instructions, which may include, for example, Bash (e.g., for Unix operating systems), ECMAScript (or JavaScript) (e.g., for web browsers), Visual Basic (e.g., for Microsoft applications), Lua, Python, and the like. The scripting language instructions can include instructions that when executed by, for example, a web browser on the FIC 10, effect rendering of an interactive graphic user interface (GUI) that facilitates bidirectional communication between the FIC 10 and the gateway server 30.

The display instructions and display data may include data to populate one or more webpages on the display of the FIC 10. The display data may include, for instance, the entity name, the entity address, or other identifying information about the entity. The AECI system 100 may be configured such that only exactly matching entity data may be displayed on the FIC(s) 10.

The display instructions and display data sent by the CICW sector 32 (Step 580) may include instructions and data to cause connected entities to be displayed, which may include displaying connections at the specific entity level on the display(s) (not shown) of the FIC(s) 10. The CICP sector 44 may be configured to compare the entity data using machine intelligence, such as, for example, fuzzy logic, neural networks, etc. Alternatively, the CICP sector 44 may be configured to compare the entity data without using artificial intelligence, such as, for example, by buffering entity data in registers (not shown) and comparing the buffered entity data for a match. The registers may be located in the gateway server 30 (shown in FIG. 1).

The display instructions and display data sent by the CICW sector 32 to the FIC(s) 10 may include instructions and data to cause the display device of the FIC 10 to display connected case records (Step 580). The connected case records may be displayed in the form of matching case cards (e.g., shown in FIG. 8), connected case trees, mind maps, or any other format that will facilitate easy and efficient viewing of the connected cases on the FIC 10. The display instructions and display data may be sent to the FIC 10 without any identifying data regarding the other FICs 10 (or external entities), so as maintain the anonymity of the other FICs 10 that had the exactly matching entity data, but do not wish to collaborate through the investigation group process. However, if the other FICs 10 wish to collaborate through the investigation group process, then identifying data for the other FICs 10 may be included in the display instructions and display data sent by the CICW sector 32 to the FIC 10 (Step 580).

Figure 6:
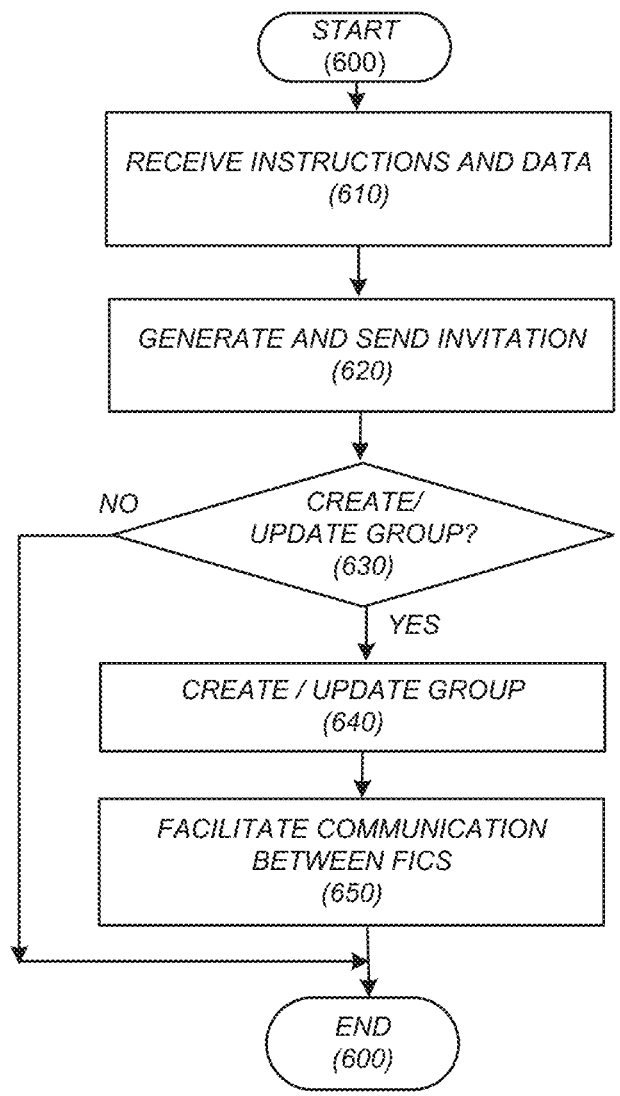
FIG. 6 shows an example of a collaboration process that may be carried out by the AECI system.

FIG. 6 shows a non-limiting embodiment of a collaboration process 600 that may be carried out by the AECI system 100. Each of the Steps 610 through 650 of the process may include a section or segment of computer code that is stored in a computer readable medium, which, when executed by one or more processors, cause each of the steps to be carried out.

Referring to FIG. 6, the CICW sector 32 may provide a collaboration status field during bidirectional communication with the FIC 10 (Step 610), and the CICW sector 32 may receive a collaboration select signal with the selected collaboration instruction, indicating the FIC's selection of availability/unavailability of case record data for display on other FICs 10. This allows the FIC 10 to receive the benefits of entity/case comparison whilst having the choice to switch off collaboration in the appropriate circumstances. This would prevent the FIC's case card from being selected for inclusion in an investigation group comprised of one or more other FICs 10.

The collaboration status field can be set to unavailable whilst the case is included in an investigation group, thereby allowing the FIC 10 to indicate to the CICC sector 36 that the rest of the FICs 10 in the investigation group are to be notified that the FIC 10 is no longer available for participation. The CICC sector 36 may communicate with the CICW sector 32 to generate and send a notification to the FICs 10 in the group. The notification may be sent as part of the display instructions and display data sent to the FIC(s) 10.

During communication with the FIC 10 (Step 610), the CICW sector 32 may receive a case card selection from the FIC 10 that requests creation of an investigation group. The CICW sector 32 can generate and send invitation signals to one or more other FICs 10 (Step 620) and, depending on the response(s) received from the other FIC(s) 10, the CICW sector 32 can create an investigation group or update an existing investigation group (YES at Step 630, then Step 640). Alternatively, the CICW sector 32 can create an investigation group sua sponte by selecting a relevant case card and generating and sending invitation signals to one or more other associated FICs 10 to join an investigation group (Steps 620 to 640). In either case, the CICW sector 32 can create the investigation group by inviting one or more other FICs 10 that had the matching entity data to join the group.

If the CICW sector 32 determines that the collaboration status for a given case record is set to "unavailable" (NO at Step 630), then that case record may not be selected for inclusion in the investigation group. If, however, the CICW sector 32 determines that the collaboration status for a given record is not set to "unavailable" (YES at Step 630), then that case record may be selected and included in the investigation group.

Once an investigation group is created (Step 640), the participating FICs 10 are enabled to communicate with each other via corresponding CICW sectors 32 (Step 650). The CICW sector 32, functioning in collaboration with the CICC sector 36, may capture and store (e.g., in the case server 40 and/or BLOB server 50, and/or in local storage in the gateway server 30) all comments, attachments, and other information and materials communicated between the FICs 10 in the investigation group, together with all other activity facilitated by the CICW sector 32 relevant to the investigation group.

The CICW sector 32 may set permission levels such that only the FIC 10 that is identified as the owner of the investigation group can remove, add, or modify case cards. The CICW sector 32 may work together with the CICM sector 34 and/or CICC sector 44 to manage and modify permission levels. The owner of the investigation group may be the FIC 10 that originally requested creation of the investigation group. FICs 10 that are members of the investigation group can change the collaboration status on their cards to "unavailable" at any stage to indicate that they no longer wish to participate in further communications.

The CICW sector 32 may facilitate communication amongst the FICs 10 via AECI messaging, which may accommodate communication of information, including attachments (Step 650). In communicating AECI messaging amongst the FICs 10, the CICW sector 32 may present each FIC 10 with the option of selecting a "disclose" command, which may be located proximate to a comment field that is left blank by default to indicate that a comment should not be shared with other FICs 10. Selection of the "disclose" field by the FIC 10 may indicate to other FICs 10 that the information may be disclosed further.

The investigation group functionality may be configured to be selective about which other group member FICs 10 a particular FIC 10 may permit to share specific comments with. According to a non-limiting example, an investigation group may contain four member (or participant) FICs 10, where two participant FICs 10 permit sharing with all other FICs 10 in the AECI system 100, and the other two FICs 10 may selectively prohibit and control sharing of information/intelligence with other FICs 10. The other two member FICs 10 may elect to share with the group owner FIC 10 (e.g., otherwise the two member FICs 10 may not have been invited to the group) but the two member FICs 10 may not necessarily have agreed to collaborate with each other. Member FICs 10 may elect and, therefore, provide instructions to allowing sharing of certain comments/info with all member FICs 10 and not others of a more sensitive nature. AECI system 100 may allow investigation group member FICs 10 to specify the recipient FIC 10 of each comment.

Figure 7:
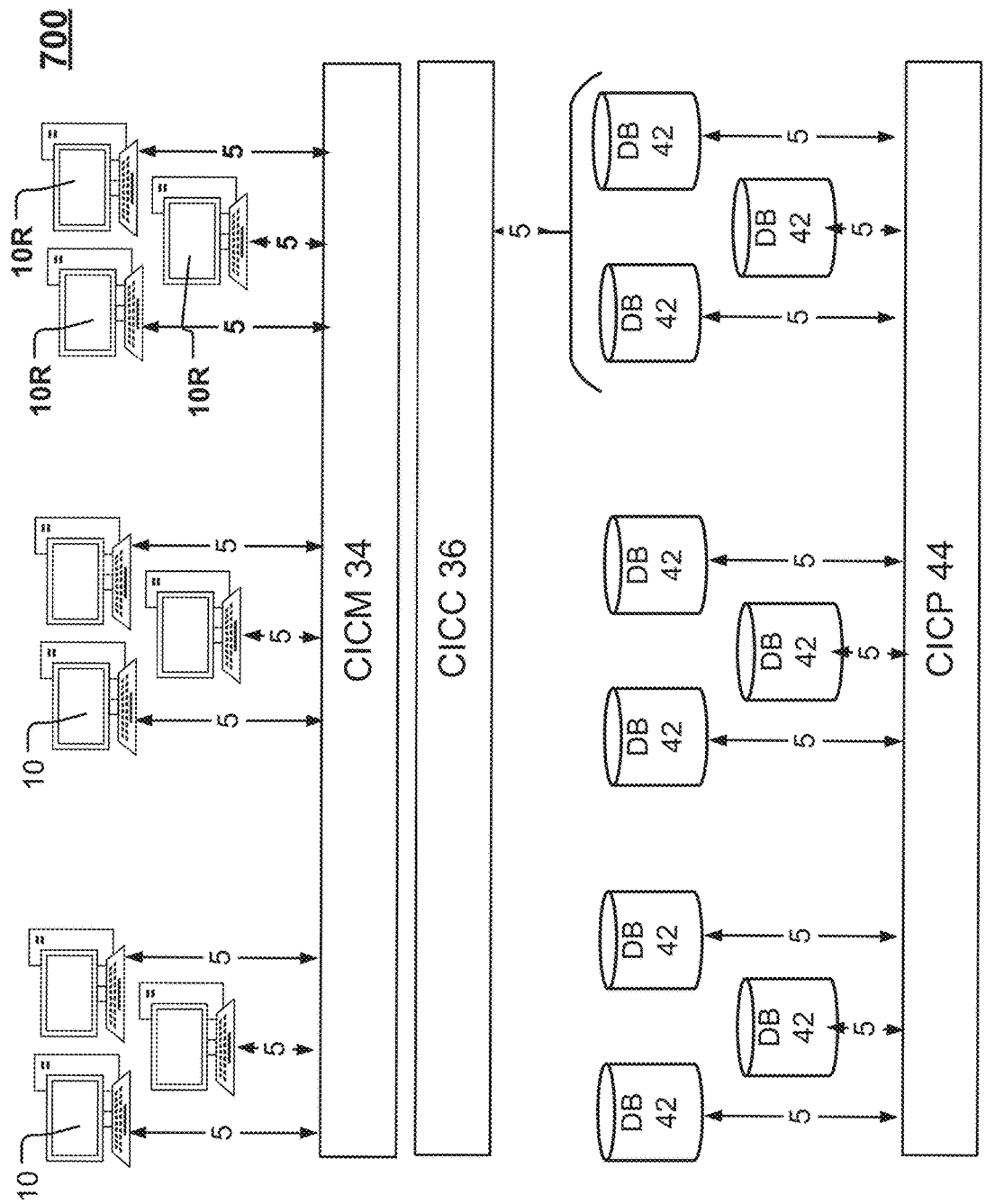
FIG. 7 shows an example of a multi-client architecture according to the principles of the disclosure, wherein a collaboration group of FICs is created.

FIG. 7 shows a non-limiting embodiment of a multi-client architecture 700 according to the principles of the disclosure, wherein a collaboration group of FICs 10R is created.

Referring to FIG. 7, an FIC 10R may request initiation of a case compare by sending a request to the CICW sector 32 (e.g., Step 510 in FIG. 5 and/or Step 610 in FIG. 6). In response to the case compare request from the FIC 10R, the CICW sector 32, which may work in coordination with the CICC sector 36, may create a collaboration group and initiate joint investigation (e.g., Steps 620 to 650 in FIG. 6). The CICW sector 32 may generate and send a query request to the CICP sector 44 in the case server 40 (e.g., Steps 510 and 560 in FIG. 5). The request may be sent with only known entity credentials. The known entity credentials (or data) received in the request by the CICP sector 44 may be used to generate further requests that are sent to databases 42, 52, so as to retrieve and return any matching data. The retrieved/returned data is then compared by the CICP sector 44 against the known entity credentials received from the FIC 10R. In this example, no data is moved from one database 42 to another, and no residual data is stored after completion of the comparison by the CICP sector 44.

Figure 8:
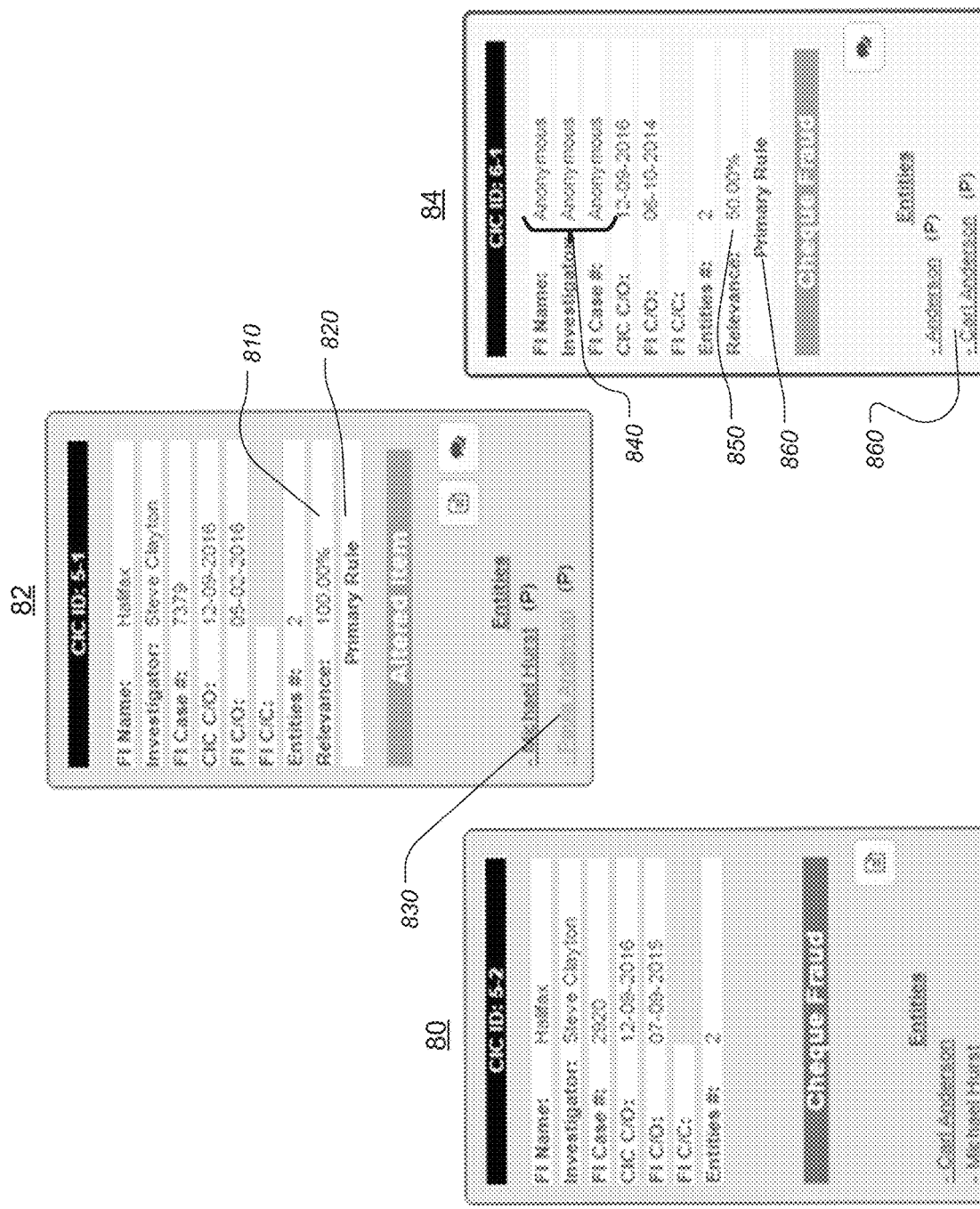
FIG. 8 shows examples of three graphic user interface (GUI) displays that may be generated and displayed in the AECI system.

FIG. 8 shows examples of three graphic user interface (GUI) displays 80, 82, 84 that may be generated and displayed, according to an aspect of the disclosure. The displays 80 and 82 may correspond to case cards provided by the requesting FIC 10R. The information in the case cards shown in GUI displays 80 and 82 may correspond to information stored in the database 42 dedicated to the particular FIC 10. The displays 80 (and/or 82) and 84 may be displayed on two separate FICs 10. Alternatively, the displays 80 (and/or 82) and 84 may be displayed on the same FIC 10.

Referring to FIGS. 7 and 8, the display 80 may be provided on the FIC 10R that sent a request with known entity data to the CICW sector 32 (shown in FIG. 1) to run a comparison against entity data of other FICs 10, which may be stored in the common database 46. The display 80 may be populated with the entity data that was sent with the request to the CICW sector 32. For instance, the display 80 may include a fraud investigation (FI) name field (e.g., "Halifax"), an investigator name field (e.g., "Steve Clayton"), a FI case number field (e.g., "2920"), a AECI C/O date field (e.g., "12-09-2016"), a FI C/O date field (e.g., "07-09-

2015"), an entities number field (e.g., "2"), an entity name field(s) (e.g., "Carl Anderson" and "Michael Hurst"), and the like.

The display 82 may be provided on the display of the FIC 10R that sent the request with entity data to the CICW sector 32. The display 82 may include the same fields as the display 80. The display 82 may correspond to an internally connected case, and further include a relevance field 810 (e.g., "100.00%"), and a rule field 820 (e.g., "Primary Rule"), and the like. As seen, the entity name field may be populated with different entities (e.g., compare "Carl Anderson" with "Paula Anderson"). The display 82 may show entity data for an internal connected case record belonging to the FIC 10R. As seen, one of the entity names may be an exact match (e.g., "Michael Hurst"), but the other entity name 830 may be different.

The display 84 may be provided to another FIC 10R in the collaboration group to be displayed on that FIC's display. The display 84 may include an externally connected case. As seen, the other FIC 10R may be provided with partially-matching entity data, without providing information 840 (e.g., FI Name, Investigator, FI Case #) to the other FIC 10R. The information 840, including, for example, the FI name, investigator name, and FI case number, may be withheld from display, so as to maintain anonymity. The display 84 may show matching entity data that was determined by the CICP sector 44 (shown in FIG. 1) to match the entity data received from the requesting FIC 10 (e.g., AECI C/O data, FI C/O data, entities number data, and matching entity name data). The display may further include a relevance field 850 and a rule field 860. In the example seen in display 84, the relevance may indicate 50%, where only one of two identified entities 860 is matched by the CICP sector 44. The matching identified entity 860 may be shown in a predetermined color (e.g., red) to alert the user of the FIC to the field. For instance, the color may depend on the status of the entity named (e.g., convicted fraudster).

Referring to FIG. 8, the FIC 10R GUI may display a collaboration group (not shown) and allow the user of the FIC 10R to update the group, cancel, view all entities, view all groups, or show rules by selection of a selector such as a radio button. In the instance where "Update Group" is displayed and selected, the FIC 10R GUI may create and display, for example, the GUI 80, 82, or 84 on the FIC's display device.

Figure 9:
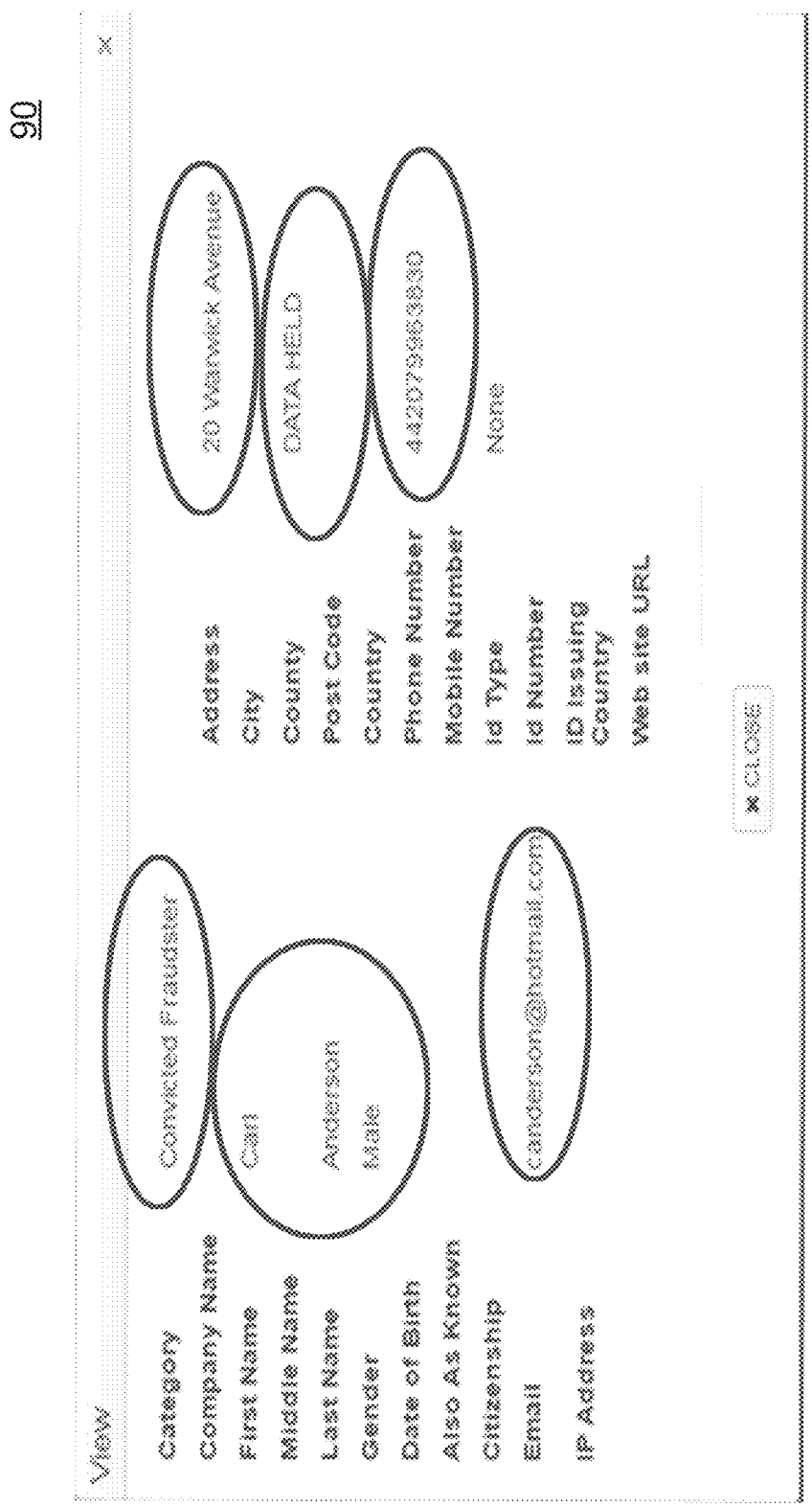
FIG. 9 shows an example of a GUI that may be displayed on a display device of an FIC in the AECI system.

FIG. 9 shows an example of a GUI 90 that may be displayed on the display device of the FIC 10R. As seen, the GUI may include a web page that comprises entity category data, including matched data held for another FIC 10R and unmatched data held for another FIC 10R. The matching data (shown in the circled areas) may be provided in the GUI display 90.

The AECI system 100 may be configured such that there is never any data at rest in any common database and CICM sectors 34 may be held and managed by individual FICs 10, and logically separated in the gateway server 30 (and/or case server 40, and/or BLOB server 50, shown in FIG. 1), so that no other FICs 10 may have access to the stored data.

The AECI system 100 reduces fraud and losses, increases asset retrieval and prosecutions and prevents further criminality. Attempted fraud data may be captured, thereby filling gaps in intelligence and improving quality of investigations. Connections between apparently disparate investigations may be easily identified. The AECI system 100 may connect frauds, offenders, associates and networks, thereby significantly enhancing the intelligence picture. The AECI system 100 enables FICs 10 to demonstrate collaborative, cohesive and efficient approaches to tackling financial crime.

The AECI system 100 is configured to provide a history of fraud affecting individuals, thereby enabling FICs 10 to provide targeted fraud prevention advice and guidance and client account monitoring.

In the AECI system 100, FICs 10 retain control of their own data at every stage. Matches are split into primary and secondary data, thereby separating potential false positives. FIC 10 to FIC 10 collaboration enables "packaging" of intelligence for SAR filing. AECI system 100 links investigations, thereby saving investigative time and resources for FICs 10 and law enforcement.

The AECI system 100 is configured to communicatively connect to each FIC 10 and establish a communication session with each FIC 10 over communication links 5. During the communication session to independently identify criminal networks and victims and work together on connected cases in a cohesive manner. Victims can be better protected and provided with preventative advice based on historical fraud attempts. As a result, financial crime prevention, detection and asset retrieval will significantly increase. FICs will experience significant savings on resource with AECI system's leaner approach to investigation and also benefit from improved public perception.

The present disclosure provides a AECI system and method that facilitate sharing of intelligence information (or data) between two or more FICs by firstly matching data on existing, independently initiated fraud investigation records. This allows FICs to identify other connected case records. The AECI system effectively provides a catalyst and further justification for FIC to FIC collaboration and intelligence sharing.

According to an aspect of the disclosure, the AECI system identifies matching data on entities (such as, e.g., individuals), thereby bringing together currently disparate existing investigations and informing the relevant FICs that such matches exist. The AECI system does this without disclosing any data that is unknown or otherwise unavailable to an FIC, and, therefore, ensures that data protection is maintained until the purpose of preventing fraud is identified. Encrypted data may be only made transparent when a critical data match occurs between two or more case records. Unmatched data may be represented by, for example, the words "DATA HELD," which provides a further incentive for FICs to explore the mismatching data components. Matches are displayed in a series of matching case card records and can also be viewed in a case tree or mind map.

The AECI system includes a case comparator (CICP) sector that executes a data matching process to enable FICs to access a much wider range of connected and potentially connected case records than would otherwise be available to the FICs. This enables FICs to create investigation groups and collaborate at the appropriate time. The AECI system ensures that FICs retain control of their own data throughout and FIC identities remain anonymous until they are ready to share intelligence. No personal entity data is retained in any common database.

The AECI system may further include an activator field that activates or deactivates a compare entity field in the CICP sector. For instance, a case record may contain an entity such as, for example, a blue-chip multinational company, which is not a suspect or a victim and whose clients are subject to multiple fraud attempts. Such an entity would result in an inordinate number of connections (and records) solely on the basis of the name of the multinational entity. This may not add value to the investigative process and may in fact create significant noise. The activator field may be controlled to selectively activate or deactivate the compare entity field in the data records that are compared in the case comparator.

The AECI system 100 may be configured such that there is never any personal entity data at rest in the common database 46, or any other location that might be accessible to any FIC 10 other than the owner of the data. The AECI system 100 may be configured so that the only data that is stored in the common database 46 is that pertaining to communications within an investigation group where the participating FICs 10 have all agreed to share information/intelligence with the other FICs 10 in the investigation group.

The AECI system 100 may include a profile generator that may attach existing entity profiles to new case records where appropriate. Each entity profile may be owned by the FIC that created it. The entity profile can be configured to only be amended/updated with the consent of the existing profile owner. The profile generator may be located in a CICW sector. The CICW sector may include or have access to a CICM sector. A unique CICM sector may be dedicated to each FIC in the AECI system.

The AECI system may include a collaboration selector field on a case record. The collaboration selector field may be activated or deactivated by the case owner via the FIC to render a specific case and its owner unavailable for invitation to an investigation group. This may allow an FIC to receive the benefits of entity/case record comparison whilst having the choice to switch off collaboration in the appropriate circumstances.

The collaboration status field may be set to unavailable whilst a case record is included in an investigation group, thereby allowing the FIC to indicate to the rest of the FICs in the group that the FIC is no longer available for participation. Alternatively, the collaboration status field may be set to available, in which case the case record may be included in the investigation group, allowing the FIC to participate in the group.

The AECI system may further include a disclose selector field. The disclose selector field may be provided (and/or displayed) next to each case record comment, which may be left blank by default indicating that a comment should not be shared with other FICs or third party computers. If the FIC indicates it appropriate to share an individual comment with other FICs, the disclose selector field may be activated beside the relevant comment to permit the comment data to be shared with the other FICs.

The AECI system may include a suspicious document library dedicated to each FIC. The suspicious document library may be stored in a database. An FIC can store information and attach documents in a suspicious document library that is dedicated to the particular FIC. For instance, the FIC can store fictitious ID data in the dedicated suspicious document library, or share certificates in a separate section of the individual case record for internal purposes. The FIC can share a redacted version of a suspicious document with external FICs by removing personal/sensitive information and actuating a share selector that updates the share field for the redacted document to enable sharing of the redacted document with other FICs. The redacted document can then be searched for and viewed by external FICs.

The AECI system may be configured to never store any data in any common database. The AECI system may dedicate unique and individually owned CICM sectors to each FIC; and, the individually owned CICM sectors and data may be logically separated in a server, thereby preventing access to the applications or data by external parties.

The AECI system is uniquely configured to aid FICs in identifying connected case records and enabling collaboration whilst also adhering strictly to data privacy principles.

The terms "a," "an," and "the," as used in this disclosure, means "one or more," unless expressly specified otherwise.

A "communication(s) link," as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G, 4G or 5G cellular standards, Bluetooth, or the like. A communication(s) link may include a public switched telephone network (PSTN) line, a voice-over-Internet-Protocol (VoIP) line, a cellular network link, an Internet protocol link, or the like. The Internet protocol may include an application layer (e.g., BGP, DHCP, DNS, FTP, HTTP, IMAP, LDAP, MGCP, NNTP, NTP, POP, ONC/RPC, RTP, RTSP, RIP, SIP, SMTP, SNMP, SSH, Telnet, TLS/SSL, XMPP, or the like), a transport layer (e.g., TCP, UDP, DCCP, SCTP, RSVP, or the like), an Internet layer (e.g., IPv4, IPv6, ICMP, ICMPv6, ECN, IGMP, IPsec, or the like), and a link layer (e.g., ARP, NDP, OSPF, Tunnels (L2TP), PPP, MAC (Ethernet, DSL, ISDN, FDDI, or the like), or the like).

A "computer," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "computer-readable medium," as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium may include a "Cloud," which includes a distribution of files across multiple (e.g., thousands of) memory caches on multiple (e.g., thousands of) computers. The computer readable medium may include the HDD 230 (shown in FIG. 2).

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

A "database," as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

An "entity," as used in this disclosure, mean any individual or group of individuals, organization, victim, intended victim, suspect, person of interest, informant, third party, a convicted fraudster, etc.

The terms "including," "comprising" and variations thereof, as used in this disclosure, mean "including, but not limited to," unless expressly specified otherwise.

A "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which may be configured to communicate data via a wireless and/or a wired communication medium. These networks may run a variety of protocols not limited to TCP/IP, IRC or HTTP.

A "sector," as used in this disclosure, means any hardware and/or software, including web-based software application, that caries out the functionalities described herein, including a computer readable medium that embodies computer readable sections or segments of code that, when executed by one or more processors, cause the processes described herein to be executed and carried out.

A "server," as used in this disclosure, means any combination of software and/or hardware, including at least one application and/or at least one computer to perform services for connected clients as part of a client-server architecture. The server may include a cloud or a server farm. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload.

For example, under light loading, the at least one application can run on a single computer. However, under heavy loading, multiple computers may be required to run the at least one application. The server, or any if its computers, may also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A non-transitory computer-readable storage medium storing computer-executable instructions that, when executed by one or more processors, cause the one or more processors to:
   initiate a communication session with a first computer device over a communication link;
   receive a settings instruction signal and a settings data signal from the first computer device over the communication link;
   parse received entity data from the settings data signal;
   query a database that includes stored entity data dedicated to a second computer device and receive queried entity data dedicated to the second computer device;
   compare the received entity data against the queried entity data;
   determine a degree of matachability of the received entity data to said queried entity data; and
   generate and transmit, via the communication link, a display signal to a graphic user interface at the first computer device to display a case card,
   wherein the case card comprises one or more fields populated with the received entity data and an indication of matchability without identifying the queried entity data or the second computer device, and
   wherein the settings instruction signal comprises a compare activation instruction signal that instructs the one or more processors to activate/deactivate an instruction tag in a database dedicated to the first computer device.

2. The non-transitory computer-readable storage medium of claim 1, further storing computer-executable instructions that, when executed by one or more processors, cause the one or more processors to decrypt the received entity data.

3. The non-transitory computer-readable storage medium of claim 1, wherein the received entity data includes a name, a gender, an address, or a telephone number.

4. The non-transitory computer-readable storage medium of claim 1, further storing computer-executable instructions that, when executed by one or more processors, cause the one or more processors to store the received entity data in a database dedicated to the first computer device.

5. The non-transitory computer-readable storage medium of claim 1, wherein the instruction tag indicates whether the received entity data is comparable in response to a query from another computer device.

6. The non-transitory computer-readable storage medium of claim 1, wherein the setting instruction signal comprises a collaboration select signal that instructs the one or more processors to create or update an available/unavailable instruction tag that indicates the associated case record is available to an investigation group comprised of one or more other computer devices.

7. The non-transitory computer-readable storage medium of claim 1, wherein the setting instruction signal comprises a collaboration status instruction signal that instructs the one or more processors to create or update a fraud investigator computer available/unavailable instruction tag that indicates that the first computer device is available to participate in an investigation group comprised of one or more other computer devices.

8. The non-transitory computer-readable storage medium of claim 1, wherein the setting instruction signal comprises a disclose instruction signal that instructs the one or more processors to create or update a disclose instruction tag that indicates that the received entity data is disclosable by one or more other computer devices.

9. A method comprising:
  initiating a communication session with a first computer device over a communication link;
  receiving a settings instruction signal and a settings data signal from the first computer device over the communication link;
  parsing received entity data from the settings data signal;
  querying a database that includes stored entity data dedicated to a second computer device and receiving queried entity data dedicated to the second computer device;
  comparing the received entity data against the queried entity data;
  determining a degree of matachability of the received entity data to said queried entity data; and
  generating and transmitting, via the communication link, a display signal to a graphic user interface at the first computer device to display a case card,
  wherein the case card comprises one or more fields populated with the received entity data and an indication of matchability without identifying the queried entity data or the second computer device, and
  wherein the settings instruction signal comprises a compare activation instruction signal that instructs the one or more processors to activate/deactivate an instruction tag in a database dedicated to the first computer device.

10. The method of claim 9, further comprising:
  decrypting the received entity data.

11. The method of claim 9, wherein the received entity data includes a name, a gender, an address, or a telephone number.

12. The method of claim 9, further comprising:
  storing the received entity data in a database dedicated to the first computer device.

13. The method of claim 9, wherein the instruction tag indicates whether the received entity data is comparable in response to a query from another computer device.

14. The method of claim 9, wherein the setting instruction signal comprises a collaboration select signal that instructs the one or more processors to create or update an available/unavailable instruction tag that indicates the associated case record is available to an investigation group comprised of one or more other computer devices.

15. The method of claim 9, wherein the setting instruction signal comprises a collaboration status instruction signal that instructs the one or more processors to create or update a fraud investigator computer available/unavailable instruction tag that indicates that the first computer device is available to participate in an investigation group comprised of one or more other computer devices.

16. The method of claim 9, wherein the setting instruction signal comprises a disclose instruction signal that instructs the one or more processors to create or update a disclose instruction tag that indicates that the received entity data is disclosable by one or more other computer devices.

17. A system for comparing and matching first entity data received from a first computer device with second entity data received from a second computer device without sharing any of the first entity data with the second computer device or the second entity data with the first computer device, the system comprising:
  a web sector that communicates with the first computer device to receive the first entity data and a settings instruction signal; and
  a case comparator sector that compares the received first entity data to the second entity data stored in a database dedicated to the second computer device to determine a degree of matchability of the first entity data to the second entity data,
  wherein the case comparator sector generates and sends the determined degree of matchability to the web sector,
  wherein the web sector generates and sends a case card to the first computer device that comprises one or more fields populated with the first entity data and the determined degree of matchability without identifying the second entity data or the second computer device, and
  wherein the settings instruction signal comprises a compare activation instruction signal that instructs one or more processors to activate/deactivate an instruction tag in a database dedicated to the first computer device.

18. The system of claim 17, further comprising:
  a case management sector that handles creation and editing of a case record in the database dedicated to the second computer device; and
  a case collaboration sector that handles creation and editing of an investigation group comprised of at least the first computer device and the second computer device.

* * * * *